(12) United States Patent
Muyzert et al.

(10) Patent No.: US 8,902,700 B2
(45) Date of Patent: Dec. 2, 2014

(54) BOREHOLE SEISMIC ACQUISITION SYSTEM

(75) Inventors: Everhard Johan Muyzert, Girton (GB); James Edward Martin, Cottenham (GB); Julian Edward Kragh, Finchingfield (GB); Gwénola Claire Marie Michaud, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 1385 days.

(21) Appl. No.: 11/994,778

(22) PCT Filed: Jun. 26, 2006

(86) PCT No.: PCT/GB2006/002352
§ 371 (c)(1),
(2), (4) Date: Jul. 14, 2008

(87) PCT Pub. No.: WO2007/003886
PCT Pub. Date: Jan. 11, 2007

(65) Prior Publication Data
US 2008/0316860 A1   Dec. 25, 2008

(30) Foreign Application Priority Data
Jul. 5, 2005 (GB) .................................. 0513745.0

(51) Int. Cl.
*G01V 1/42* (2006.01)

(52) U.S. Cl.
CPC ........................................ *G01V 1/42* (2013.01)
USPC ..................... 367/25; 367/38; 367/57; 367/58

(58) Field of Classification Search
CPC ....................................................... G01V 1/42
USPC ......... 114/245; 166/380; 175/45, 61, 73, 320; 181/110, 112, 104; 324/369; 367/19, 367/20, 27, 31, 75, 149, 153, 154, 173, 178, 367/25, 28, 30, 47, 57, 73, 129, 130; 702/6, 702/17; 73/653
See application file for complete search history.

(56) References Cited

U.S. PATENT DOCUMENTS 3,437,169 A   4/1969   Youmans
4,383,308 A   5/1983   Caldwell
(Continued)

FOREIGN PATENT DOCUMENTS

GB   2 341 680 A   3/2000
GB   2 363 459 B   4/2003
(Continued)

OTHER PUBLICATIONS

Milligan: "Hydrophone VSP imaging at a shallow site", Geophysics, vol. 62, No. 3, 1997, pp. 842-852.
(Continued)

*Primary Examiner* — Daniel L Murphy

(57) ABSTRACT

A borehole seismic acquisition system is described with a plurality of sensors arranged so as to identify within the data measured by the pressure sensors P- and S-wave related signals converted at the boundary of the borehole into pressure waves, the sensors being best arranged in groups or clusters sensitive to pressure gradients in one or more directions.

19 Claims, 8 Drawing Sheets

(56) References Cited

U.S. PATENT DOCUMENTS

| | | | |
|---|---|---|---|
| 4,449,208 A * | 5/1984 | Moeckel et al. | 367/30 |
| 4,547,869 A * | 10/1985 | Savit | 367/149 |
| 4,563,757 A | 1/1986 | Decorps et al. | |
| 4,648,082 A | 3/1987 | Savit | |
| 4,692,907 A * | 9/1987 | Jubinski | 367/20 |
| 4,752,916 A | 6/1988 | Loewenthal | |
| 4,789,968 A * | 12/1988 | Rice | 367/20 |
| 4,870,580 A | 9/1989 | Lang et al. | |
| 5,077,697 A | 12/1991 | Chang | |
| 5,226,017 A | 7/1993 | Fortin | |
| 5,475,650 A * | 12/1995 | Sinha et al. | 367/31 |
| 5,808,963 A * | 9/1998 | Esmersoy | 367/31 |
| 6,580,661 B1 | 6/2003 | Marschall et al. | |
| 6,671,223 B2 * | 12/2003 | Bittleston | 367/19 |
| 6,684,160 B1 * | 1/2004 | Ozbek et al. | 702/17 |
| 6,853,604 B2 * | 2/2005 | Spackman et al. | 367/154 |
| 7,172,038 B2 * | 2/2007 | Terry et al. | 175/45 |
| 2002/0044498 A1 * | 4/2002 | Krebs et al. | 367/27 |
| 2004/0211569 A1 * | 10/2004 | Vinegar et al. | 166/380 |
| 2005/0041526 A1 | 2/2005 | Esmersoy et al. | |

FOREIGN PATENT DOCUMENTS

| | | |
|---|---|---|
| GB | 2 410 551 A | 8/2005 |
| GB | 2 424 277 A | 9/2006 |
| WO | WO 97/25632 A1 | 7/1997 |
| WO | WO 02/01254 A1 | 1/2002 |
| WO | WO 02/073239 A1 | 9/2002 |

OTHER PUBLICATIONS

Schoenberg: "Fluid and solid motion in the neighborhood of a fluid-filled borehole due to the passage of a low-frequency elastic plane wave", Geophysics, vol. 51, No. 6, 1986, pp. 1191-1205.
Society of Exploration Geophysicists: "Seismic 19—vertical seismic profiles I", Expanded Abstracts of the Technical Program with Authors' Biographies, Sep. 11-15, 1983, Las Vegas, pp. 522-540.
Wuenschel: "The vertical array in reflection seismology—some experimental studies", Geophysics, vol. 41, No. 2, 1976, pp. 219-232.
Hardage, "Offshore Energy Sources—p. 31,"Tube Waves—pp. 71-84," "Chapter 7: Exploration Applications of Vertical Seismic Profiling—pp. 263-264," selected pages from Seismic Exploration, 1983, vol. 14A Vertical Seismic Profiling Part A: Principles," London: Geophysical Press.

* cited by examiner

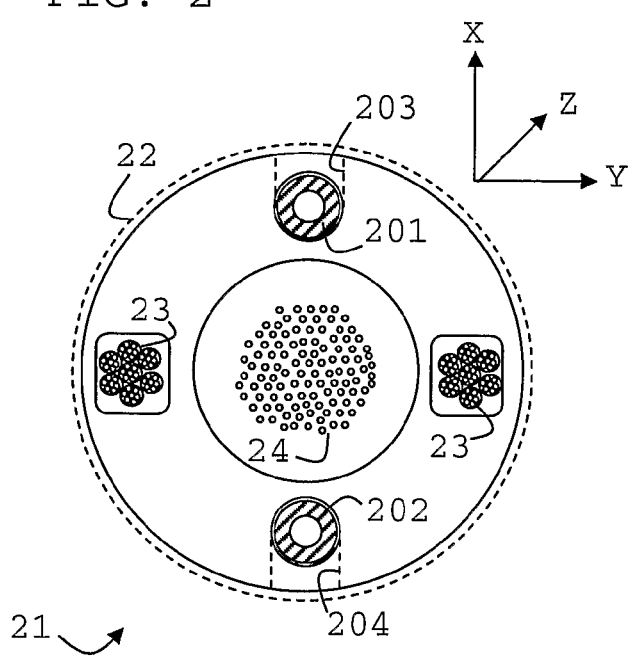
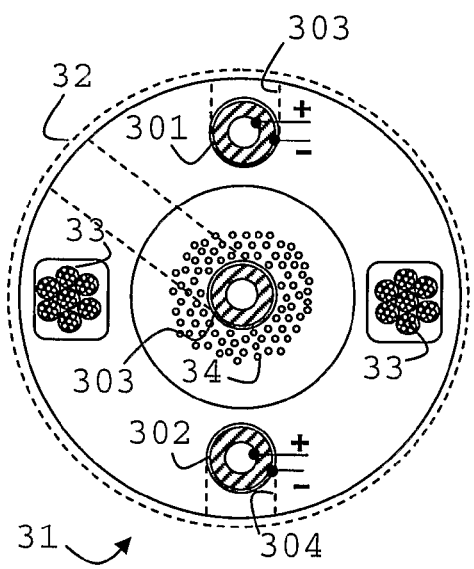
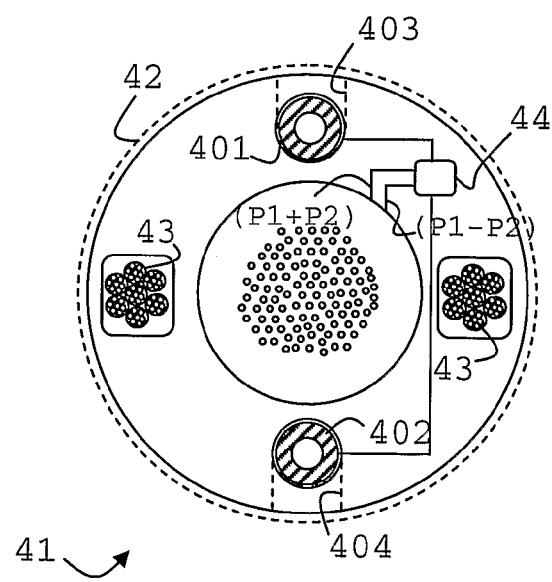

BOREHOLE SEISMIC ACQUISITION SYSTEM

CROSS-REFERENCE TO RELATED APPLICATIONS

This application claims the benefits of priority from:
i) Application Number 0513745.0, entitled "BOREHOLE SEISMIC ACQUISITION SYSTEM," filed in the United Kingdom on Jul. 5, 2005; and
ii) Application Number PCT/GB2006/002352, entitled "BOREHOLE SEISMIC ACQUISITION SYSTEM," filed under the PCT on Jun. 26, 2006;
All of which are commonly assigned to assignee of the present invention and hereby incorporated by reference in their entirety.

This invention relates to methods and apparatus for acquiring seismic data using sub-arrays of seismic sensors in a cable-type or borehole seismic cable-like seismic acquisition system for use in a borehole.

BACKGROUND OF THE INVENTION

Present borehole seismics involves techniques in which seismic signals generated at or near the surface of the earth or in a borehole are recorded by geophones secured at various depths to the wall of a borehole. Unlike the more commonly used land seismic or horizontal seismic profiling, where the geophones are strung along the earth surface, borehole seismics uses geophones at locations spaced along the borehole axis. These geophones are sensitive to velocity changes or acceleration and typically respond to both upgoing and downgoing seismic events, in contrast to horizontal seismic profiling, where the geophones typically cannot respond directly to downgoing events.

Borehole seismic measurements can give insight into some fundamental properties of propagating seismic waves and assist in the structural, stratigraphic, and lithological interpretation of subsurface formations. For example, an important use of vertical seismic profiling (VSP) measurements is to help define upgoing and downgoing seismic events within the earth and thereby help determine which events arriving at the surface are primary reflections and which are multiples. Other applications of borehole seismics include estimation of reflector dip, correlation of shear wave reflections with compressional wave reflections, location of fault planes, determination of lithological effects on propagating wavelets, looking for reflectors ahead of the drill bit, determining hydrocarbon effects on propagating wavelets, identification of intrabed multiples, measurement of both compressional and shear wave velocities, and estimation of the conversion of compressional to shear and shear to compressional energy modes within the earth. Background information concerning borehole seismics, in particular VSP can be found in Hardage, B. A., Vertical Seismic Profiling, Part A: Principles, Geophysical Press, 1983, Volume 14A of Handbook Of Geophysical Exploration, Section I. Seismic Exploration, Helbig and Treitel (Editors); Society of Exploration Geophysics, Expanded Abstracts of the Technical Program With Authors' Biographies, Sep. 11-15, 1983, Las Vegas, Nev., pp. 522-540; Wuenschel, P. C., The Vertical Array In Reflection Seismology—Some Experimental Studies, Geophysics, Volume 41, No. 2 (April 1976), pp. 219-232; and U.S. Pat. Nos. 4,383,308 and 4,563,757.

As discussed in greater detail in these background documents, which are hereby incorporated by reference, in principle borehole seismics involves providing a seismic source at or near the earth surface and near a borehole, and providing vertical seismic profile measurements by means of geophones positioned at selected depth levels in the borehole. The source may also be placed in a borehole which in turn could be the borehole housing the receivers. While it should be possible to position geophones at each desired depth in the borehole such that all can respond to the same seismic event generated by the source, it is believed typical to use instead a geophone (or geophones) carried by a single seismic tool which is suspended by cable in the borehole and is successively clamped to the borehole wall at selected depths, to thereby respond to different wavelets from the source at different depths.

Various kinds of seismic sources can be used, and typically it is desirable that the source produces a consistent and repeatable shot wavelet, particularly when a single downhole geophone tool is used. For example, the source can be a small chemical explosive shot near the bottom of a relatively shallow, cased and cemented well drilled near the borehole, or it can be one of the impulsive surface sources, such as weight droppers and devices that use explosive gases or compressed air to drive a heavy pad vertically downward with great force, or vibrators of the kind used as energy sources in hydrocarbon exploration. The source or sources can alternatively be placed in a neighboring well or even in the same borehole as the receivers.

The borehole can be vertical or deviated, so long as the deviation is accounted for in interpreting the measurements, and can be cased or uncased. A typical downhole tool used in vertical seismic profiling typically contains at least one geophone that is sufficiently protected to withstand the adverse environment in a deep borehole and yet can achieve satisfactory acoustic coupling with the formation. Two typical configurations are a tool that has a retractable electrically operated pivot arm which can press the geophone(s) against the borehole wall at selected depth levels, and a tool with a retractable electrically driven telescoping ram serving the same purpose. The geophone transducer element or elements in a VSP tool can be either only vertically oriented or can be, for example, in a 3-component orientation (e.g., orthogonal at xyz or tilted relative to each other at some other angle, e.g., at 54.degree.). In 3-component xyz geometry, the geophone along the z (depth) axis in a vertical borehole measures vertical particle motion, and the geophones oriented along the x and y directions measure particle motion along two orthogonal directions in the horizontal plane. Typically the three geophones are designed to exhibit closely matched amplitude and phase responses, and the device that presses the tool against the borehole wall is designed to create a geophone-to-formation bond which would result in the horizontal geophones being mechanically coupled to the formation in the same way as the vertical geophone. A 3-component tool typically also includes an orientation measuring device (typically made up of one or more magnetometers that measure azimuth from magnetic North and one or more gravity sensitive accelerometers that measure deviation from vertical), a downhole digitizing system which can digitize the geophone transducer outputs within the tool and send the digitized signals up to the surface through wires in the cable suspending the tool, and other equipment, such as devices to check the quality of acoustic coupling with the formation. Known processing equipment and techniques can be used at the surface to record the tool outputs and make preliminary corrections, such as for tool orientations, to thereby produce vector measurements which can be designated u (x=0, z, t). Each such measurement can be a digitized vector set identifying the direction in space and the magnitude of the seismic energy measured by the 3-component VSP tool at, the borehole (x=0) at depth z for each sample time t over a selected time interval. Further details can be found in U.S. Pat. No. 4,563,757.

Typically the output of any given geophone contains contribution from both compressional and shear wave components (and may contain contributions from other wave components) even when the surface seismic source is designed to optimize the generation of compressional and minimize the generation of shear waves. Even if the surface source could generate a purely compressional wave, a considerable amount of compressional wave energy may still be converted into shear wave modes whenever a propagating compressional wave encounters a reflecting surface at an oblique angle of incidence. It is believed that these converted shear wave modes can be valuable for interpreting subsurface geological conditions, as can be shear modes deliberately created by shear wave energy sources. For example, converted shear wave modes can be particularly valuable seismic measurements when used in concert with compressional wave energy measurements to interpret elastic constants of rocks or to predict the types of pore fluids in rock units or to predict other subsurface lithology parameters. In addition, certain techniques can benefit from such separation because they need, or are believed to work better with, direct or indirect measurements of only the compressional, or only the shear components of the total energy arriving at downhole geophones. One example is the use of a technique similar to medical computed tomography and relying on offset VSP, or on well-to-well VSP measurements to image the zx plane of interest. Such a technique is helped by the use of data representing the separated compressional (or perhaps shear) component of the total energy measured at the downhole geophones.

For these and other reasons, proposals have been made in the past to separate the compressional and shear wave components of the seismic energy measured at a borehole receiver. For example, the Hardage document cited earlier proposes, e.g. at page 413, that with a 3-component tool the responses of the triaxial geophone system can be mathematically rotated so that they represent the output of a single geophone oriented along the ray path of the compressional wave first arrival at each recording level, and that data can be derived which represent the response that a geophone would record if it were positioned in a vertical plane containing the compressional wave first arrival ray path and then oriented in this plane so that it is normal to the compressional wave ray path, and that these data thus would contain the full response of those downgoing shear velocity modes which travel along the same ray path as the compressional wave direct arrival, partial responses of SV modes which arrive at the triaxial geophone arrangement along ray paths that differ from the compressional wave ray path, and partial responses of later arriving downgoing or upgoing compressional wave events whose ray paths intersect the geophone assembly at various angles of inclination. The earlier cited document concerning the technical program of Sep. 11-15, 1983 in Las Vegas, Nev. proposes, e.g. at page 522, that for processing VSP data from compressional wave or shear wave sources, the apparent velocity between recording positions can be used to separate upgoing and downgoing waves, and that similarly, the P, SV, and SH modes for the direct arrival in a VSP can be isolated, based on their orthogonal polarization, but reports that both techniques break down when analyzing complex wave types such as converted waves. The same document proposes at pages 524-527 a technique which involves considering the first compressional (P) ray as included in the source-well plane, deriving a projection along the first arriving P ray, which should give mainly the first arriving P ray and following multiples, deriving a projection which is normal to that first arriving P ray and is in the source-well plane, which should give direct and converted shear SV waves, and deriving a projection normal to the source-well plane, which should give shear SH waves. The Hardage document cited earlier observes, e.g. at pages 177 and 178, that when VSP measurements taken in the space-time domain are converted to the frequency-wavenumber domain, a masking function could be superimposed over the VSP data in the frequency-wavenumber domain in order to suppress events not travelling with compressional velocity, and gives a conceptual illustration at FIG. 5-20 of a so-called pie slice velocity band pass masking function which would reduce the magnitudes of all energy modes except the upgoing compressional reflections. Other types of frequency-wavenumber velocity filtering are also discussed in the Hardage document, e.g. at pages 174-176.

The knowledge derived from VSP and/or other logs (e.g., sonic) can comprise the local compressional and shear velocities and/or the local slowness, such as the local slowness of waves in the vector wavefield. Because of the assumption that the formations adjacent the borehole are locally isotropic, there is only a single inherent P or S velocity for a given depth, and it can be assumed to be that measured by a sonic logging tool or by a zero-offset VSP. In principle, the main steps of an embodiment of the invention are to decompose the 3-component measurements into local plane wave components, identify the P and S waves of each plane wave component by polarization, and separately recombine the so-identified P and S waves.

The above and other aspects of VSP and borehole seismic methods are described in the U.S. Pat. No. 4,870,580, including further details of P- and S-wave separation and processing as may provide additional background information for the present invention.

As it is an important aspect of VSP and related borehole seismic methods to separate P- and S-wave events, VSP cables comprise typically geophones or accelerometers. Hydrophones as predominantly used in marine seismic acquisition systems, are rarely found in borehole systems. The geophones are closely coupled to the wall of the borehole via suitable springs or clamping apparatus as known in the art. If hydrophones are used in VSP equipment, these are typically combined with geophones to provide an additional pressure measurement.

In the known methods and apparatus of marine seismics, the towed streamer comprises a plurality of pressure sensitive hydrophone elements enclosed within a waterproof jacket and electrically coupled to recording equipment onboard the vessel. Each hydrophone element within the streamer is designed to convert the mechanical energy present in pressure variations surrounding the hydrophone element into electrical signals. This streamer may be divided into a number of separate sections or modules that can be decoupled from one another and that are individually waterproof. Individual streamers can be towed in parallel through the use of paravanes to create a two-dimensional array of hydrophone elements. Data buses running through each of the modules in the marine streamer carry the signal from the hydrophone elements to the recording equipment (so-called acoustic data). Hydrophones when applied in borehole seismics, have been used to measure solely a local pressure.

A hydrophone may produce electrical signals in response to variations of acoustic wave pressure across the hydrophone. Several hydrophones may be electrically coupled together to form an active section or group of an acoustic sensor array or streamer. Electrical signals from multiple hydrophones of an active section are typically combined to provide an average signal response and/or to increase the signal-to-noise ratio.

In the light of the above, it is an object of this invention to provide an improved borehole seismic acquisition system which does not require extensive clamping devices.

SUMMARY OF THE INVENTION

According to a first aspect of the present invention, there is provided a borehole seismic survey system with a cable with a plurality of pressure sensors, wherein said plurality of pressure sensors is arranged in groups of at least two pressure sensors with a group output being representative of a transversal pressure gradient at the group location.

Alternatively, the invention can be regarded as providing a borehole seismic tool including groups of pressure sensors, such as hydrophones, adapted to register both P-waves and S-waves, whereby the later are converted at the interface of the borehole with the formation into compressional wave modes. The modes can be registered by groups of pressure sensors arranged in accordance with the present invention.

The transversal pressure gradient is understood as a pressure gradient orthogonal to the vertical pressure gradient. The direction of these gradients can be understood as either absolutely with respect to the earth surface as reference or relatively with the vertical direction being defined as the local longitudinal axis of the borehole.

Preferably the system is capable of measuring vertical and transversal pressure gradients, and even more preferably the system is capable of measuring the pressure gradient in three independent directions, such as in x, y and z-direction with x, y and z being the axes of a local or global coordinate system.

It is a further aspect of the invention that the borehole cable designed to detect P- and S-wave events in the seismic signals entering the borehole uses pressure sensors rather than velocity sensors, but in further processing steps the pressure measurement can be transformed into particle velocity measurements. Though geophones may be present in the cable for various purposes, it is expected that commercially viable embodiments of a cable in accordance with the present invention comprise more pressures sensors or hydrophones than velocity sensors or geophones. The cable is deployable without the need to mount each sensor group on a clamping device to be coupled to the wall of the borehole. In fact the present invention can be implemented with a minimum of such devices, being ideally freely suspendable into a (vertical) wellbore or centralized within the borehole using centralizers as are known per se in the field of downhole tools.

The system may further comprise one or more electromechanical transducers for determining the relative position of said at least two pressure sensors in order to determine their vertical separation.

A group is defined by (a) proximity and (b) by the processing of the outputs of the hydrophones. The hydrophones of a group are essentially closest neighbors. In a cable the hydrophones within a group are typically separated 1 to 10 cm, whereas the inter-group distance is 0.5 or 1 meter to 7.5 meters. In a preferred embodiment, the at least two pressures sensors contributing to the group output being representative of the transversal pressure gradient are located within a section the cable of less than 6 cm or even 3 cm length, thus allowing to be mounted onto one single hydrophone holder in a cable.

In a preferred variant, the hydrophones of a group are equidistantly spaced.

Preferably most or all of the hydrophones within a group are arranged in a plane perpendicular to the main axis of the cable. However, for a full waveform recording involving the acquisition of vertical, inline and crossline seismic signals, it is important to have at least one pressure sensor located off-plane. Or, alternatively, a sensor of a neighboring group provides the additional off-plane pressure measurement. In a preferred variant of the invention, a group could consist of four hydrophones in a tetrahedral arrangement.

It is advantageous to combine or hardwire the output signals of the hydrophones and/or amplify them prior to a digitization process as the pressure difference between two narrowly separated hydrophones can be extremely small.

It is a further aspect of the invention to provide a system to determine the orientation of the hydrophones in a group, in particular the projection of the distance between those hydrophones in direction of the pressure gradient to be determined. The measurement of the orientation or the angle of rotation may become necessary as the cable, when suspended in or pulled through a borehole, is subject to twisting and turning. In a preferred variant the inclinometric system comprises one or more electromechanical or electroacoustic devices that are not hydrophones.

The electromechanical or electroacoustic devices may take the form of a plurality of small inclinometers. It was found that accurate measurement could be performed using small and robust, preferably solid-state, inclinometers known as such. By distributing a sufficient number of such known sensors along the cable, its orientation with respect to the vertical and/or horizontal direction can be measured.

These and further aspects of the invention are described in detail in the following examples and accompanying drawings.

BRIEF DESCRIPTION OF THE DRAWINGS

The invention will now be described, by way of example only, with reference to the accompanying drawings, of which:

FIG. 2 is a vertical cross-section of a borehole seismic cable with two hydrophones;

FIG. 3 shows a vertical cross-section of a borehole seismic cable with three hydrophones;

FIG. 4 shows a vertical cross-section of a borehole seismic cable with two hydrophones and a unit that generates the sum and the difference of the outputs of the two hydrophones as output signals;

DETAILED DESCRIPTION

Figure 1A:
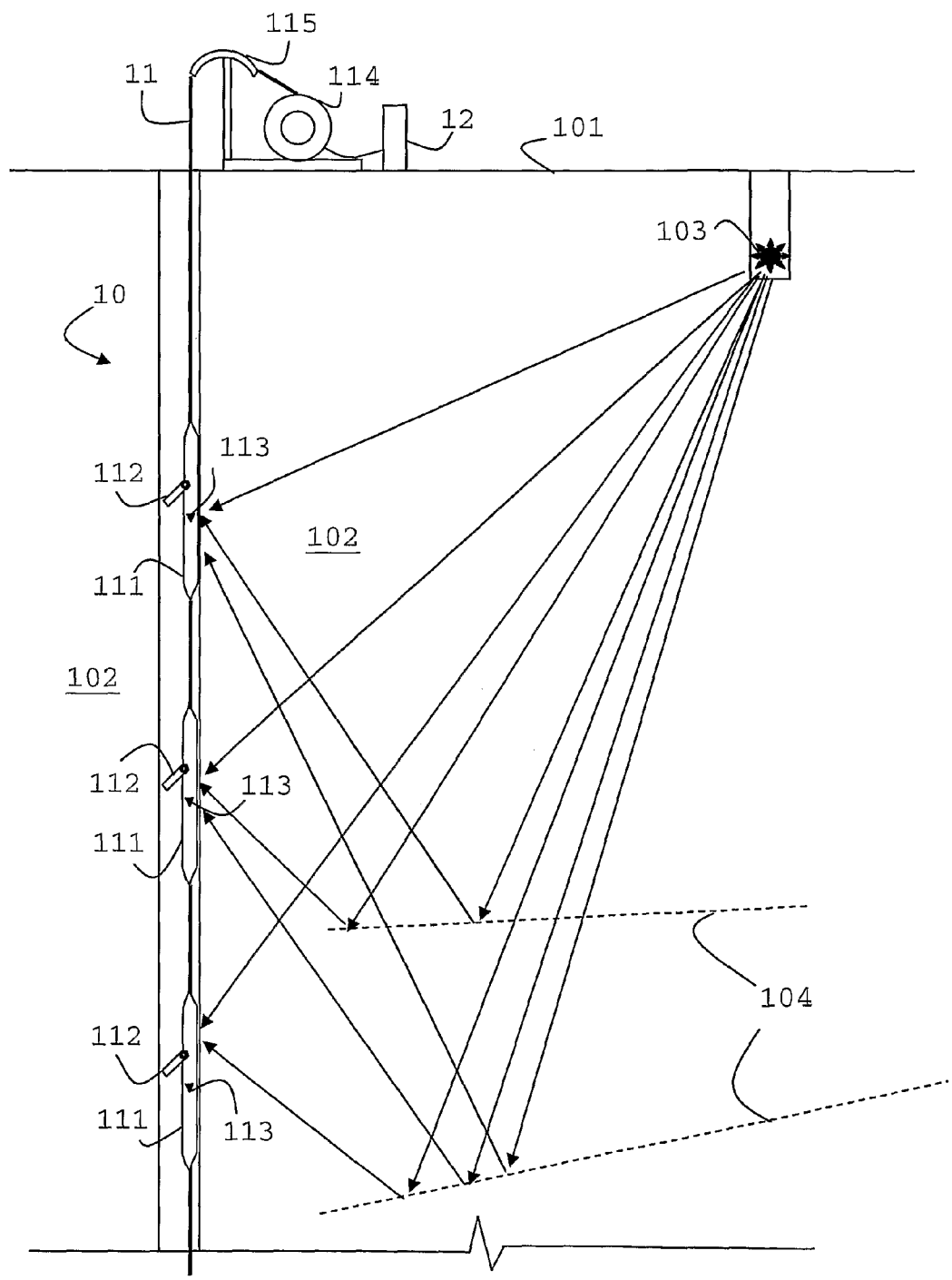
FIG. 1A shows a schematic illustration of a vertical seismic profiling operation using known methods and apparatus.

A typical vertical seismic acquisition in a borehole is illustrated in FIG. 1A. There is shown a borehole 10, Suspended from the surface 101 into the borehole 10 is a cable 11 carrying a plurality of VSP geophones 111. Each of the three geophones 111 includes a clamping or locking mechanism 112 designed to push or wedge the geophone against the formation 102 or any casing surrounding the wellbore 10.

The clamping or locking mechanism 112 can be based on the use of springs, telescopic rams or pivoting arms as shown. The geophones 111 typically carry transducer elements 113 to measure the velocity or acceleration in one or three independent directions. The clamping mechanism 112 ensures that the transducers 113 are coupled intimately to the borehole wall. It is important to note that in a typical VSP operation, a significant increase in the signal-to-noise ratio can be observed when the geophone loses contact with the wall of the borehole 10.

On the surface, a cable reel 114 and feed 115 supports the cable 11. Measurement signals or data are transmitted through the cable to a base station 12 on the surface for further processing. The cable is typically an armored cable as used for wireline operations with a plurality of wire strands running through its center.

In operation a source 103 as shown is activated generating waves of seismic energies, which travel through the formation 102. Where the formation changes its impedance (as indicated by dashed lines 104) part of the seismic energy is either reflected or refracted. The geophones 111 register movements of the earth and the measurements are transmitted directly or after in-line digitization and/or signal processing to the surface base station for storage, transmission and/or further processing. The subsequent data processing steps are known and well established in the field of hydrocarbon exploration and production.

Figure 1B:
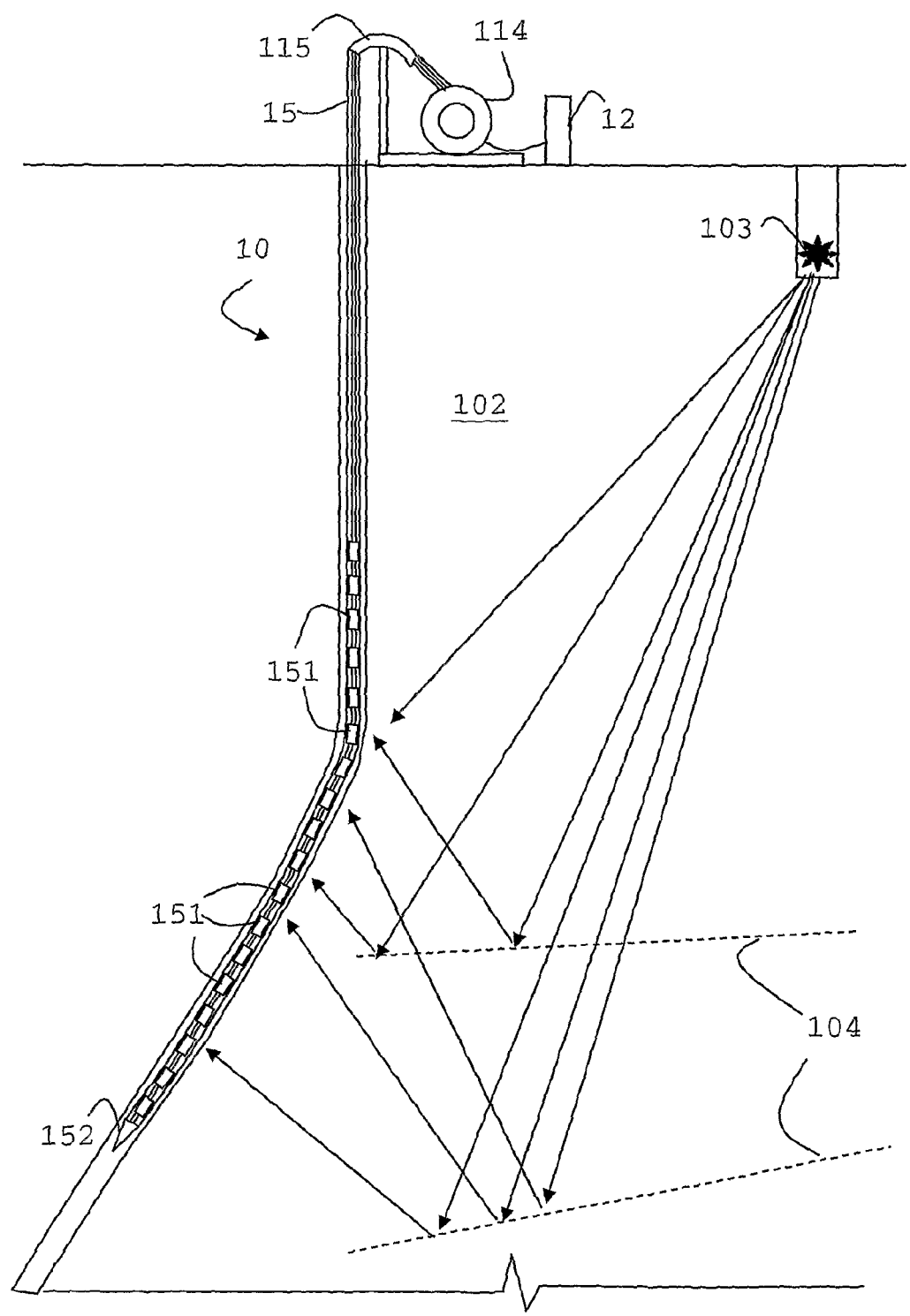
FIG. 1B shows a schematic illustration of a vertical seismic profiling operation using methods and apparatus in accordance with an example of the invention.

In FIG. 1B there is shown a similar set-up as in FIG. 1A. The geophone-carrying cable 11 of FIG. 1A is however replaced by a cable 15 having a plurality of internal mounts 151 to each accommodate two or more hydrophones. The cable has thus the appearance of a streamer as used in marine seismic acquisitions in that the hull or outer layer of the cable forms the outer layer or hull of the receivers and, hence, that the cable has an essentially uniform diameter along the section carrying the receivers and sections connecting receiver locations. This is fundamentally different from the typical borehole seismic cable, in which larger geophone housings are connected by sections of cable with reduced diameter compared to the geophones. The cable 15 is referred to herein as borehole seismic cable. The borehole seismic cable can be deployed from a cable reel 114 as in FIG. 1A. A conically shaped bottom part 152 is designed to facilitate the lowering of the cable into the borehole. In highly deviated or horizontal wells the cable deployment may be assisted by a tractor unit (not shown) which pulls the cable through the wellbore 10.

In contrast to the conventional borehole cables which use geophones clamped and thus closely coupled to the borehole it may be advantageous to equip the seismic cable as envisaged herein with centralizer (not shown) so as to provide a uniform central placement of the receivers in the well. Ideally the hydrophones are all decoupled from the wall of the wellbore.

The hydrophones used in the example are of the known piezo-ceramic tube type. As the geometrical arrangement of the hydrophones is an aspect of the present invention, the details of several possible arrangements of hydrophones inside the borehole seismic cable are described in the following figures.

A cross-section of hydrophone holder 21 inside a borehole seismic cable 20 is shown in FIG. 2. Two hydrophones 201, 202 are arranged diametrically opposed to each other inside the openings 203, 204 of the holder 21. A flexible outer sheath 22 protects the hydrophones from a direct contact with the wall of the borehole. Each hydrophone consists of a hollow tube of piezo-ceramic material. Pressure leads to a deformation of the tube which in turn generates an electrical signal that, suitably amplified and calibrated, serves as a measure of the pressure.

Depending on the type of borehole seismic cable, one or more stress members 23 of braided wire run through the borehole seismic cable along the length of borehole seismic cable segments or along its entire length. A data transmission backbone cable comprising of a plurality of electrical conductors and/or optical fibers 24 communicates data along the length of the borehole seismic cable as well as to and from the towing vessel. The hydrophone holder 21 shown is one of a large number of holders distributed along the borehole seismic cable. A borehole seismic cable typically includes further chambers (not shown) between the holders to be filled with either fluid (such as air, water or kerosene) and/or a solid material (such as foam). It is thus possible to tune the buoyancy of the borehole seismic cable in the borehole.

Typically the hydrophones used in the borehole seismic cables are cylindrical devices with their main axis (Z) parallel with the main axis of the cable and thus with the longitudinal axis of the borehole. In a strictly vertical well the Z axis would be oriented in the vertical direction. The X-axis and Y-axis are separately and collectively referred to as transverse direction(s) to the normal direction taken to be the Z-axis. The cross-section view of FIG. 2 shows the a plane perpendicular to the longitudinal axis of the cable, i.e. the Z axis and hence parallel to the X,Y plane.

It is known that the transverse pressure gradient at a location z along the borehole seismic cable can be measured using two hydrophones with a known distance between them. The transverse pressure gradient in x-direction dP/dx at a position z in the well can be calculated from two hydrophone recordings separated by $\Delta x$ through subtraction of the two measurements.

$$dP(z)/dx = (P(x1,z) - P(x2,z))/(x1-x2) \quad \text{[1A]}$$

where P1(x1, z) and P2(x2, z) indicate the pressure as measured by the hydrophone 201 and the hydrophone 202, respectively. The calculation of the transverse pressure gradient in Y-direction is identical (exchanging the x by the y coordinate).

Using pressure measurement spread in axial (vertical) direction, i.e. at different positions z1 and z2, the longitudinal pressure gradient can be calculated using $$dP(z1)/dz = (P(z2) - P(z1))/\Delta z \quad \text{[1B]}$$

taking measurements from vertically separated hydrophones at positions z1 and z2, respectively.

The total pressure P at the location z can be found from the output of one of the hydrophones or the average of the two hydrophone measurements.

In FIG. 3, a variant of the above hydrophone group is shown. In the example the holder 31 includes an additional centrally located hydrophone 303 that is added to the group of two transverse separated hydrophones 301 and 302 as described before. To the extent that other elements of FIG. 3 have already described in FIG. 2 an equivalent numerals has been used and further description of those elements has been omitted. In the variant of FIG. 3, it is seen as an advantage that a measurement of the pressure gradient can be effectively achieved by connecting electrically the (+) pole of one hydrophone with the (−) pole of the other and visa versa. The potential difference between the two connections yields the pressure difference dP. The additional third hydrophone 303 is used for the mean pressure measurement P.

Because the difference between the two hydrophones signals is very small this subtraction, carried out local to the sensors before digitization, is potentially more accurate than the arrangement of FIG. 2.

In the example of FIG. 41 two hydrophones 401, 402 are used to determine the pressure difference P1−P2 and the pressure sum P1+P2 using an appropriate electric circuit or network 44 of conductors. The two hydrophones 401, 402 are connected such that one output of the circuit 44 is proportional to the difference between the hydrophones and thus the pressure gradient, whilst the other is proportional to the sum and the mean pressure between the two hydrophones, i.e. to $P_1-P_2$ and $P_1+P_2$, respectively. To the extent that other elements of FIG. 4 have already described in FIG. 2 an equivalent numerals has been used and further description of those elements has been omitted It is worth noting that a great dynamic range of the recording system is necessary in order to achieve the required accuracy of measurement of the pressure gradient.

Figure 5:
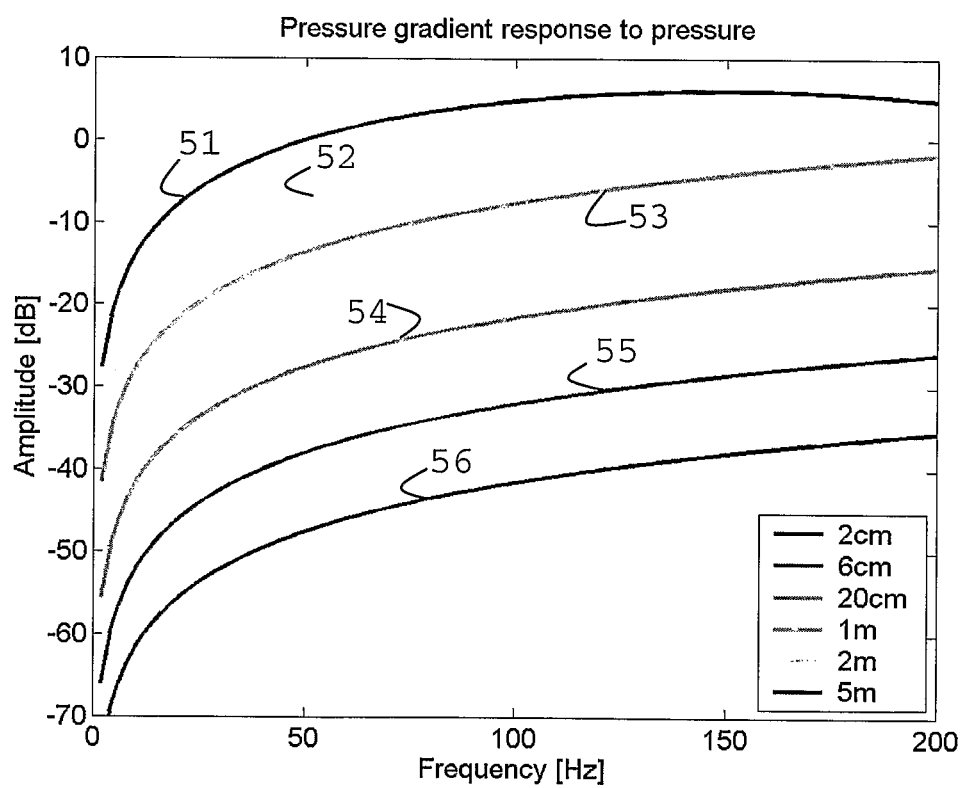
FIG. 5 is a plot of the relative amplitude of a pressure gradient measurement as function of the signal frequency and sensor spacing.

The theoretical amplitude response of two hydrophones at a given transverse separation to a pressure wave propagating horizontally through the borehole as function of frequency and sensor separation can be expressed as:

$$F(\omega) = |\exp(-ikx) - \exp(ikx)| \qquad [2]$$
$$= |1 + i2\sin(\omega x/c)|$$

where z is half the transverse sensor separation. This response F(w) has been modeled for 6 different sensor separations: 2 cm (51), 6 cm (52), 20 cm (53), 1 m (54), 2 m (55) and 5 m (56) and plotted in FIG. 5. For example, in case of a 6 cm separation between the hydrophones, curve 52 predicts a transverse pressure gradient signal with respect to the pressure at that frequency of −57 dB at 5 Hz, −38 dB at 50 Hz and −32 dB at 100 Hz.

The amplitude of the pressure gradient signal decreases with decreasing frequency, at 5 Hz it is 0.001412 times weaker than the pressure signal (−57 dB). With regard to a digitized output, this means that the first 10 significant bits of a pressure recording are not used (i.e. are zeros). When subtracting the hydrophones before recording, this bit-loss does not occur, although an additional preamplifier might be required to boost the weaker gradient signal.

In VSP data processing the data is usually separated into up- and downgoing wavefield. In addition, the processing is often aimed at the separation of P-wavefield and converted S-wave fields as well as obtaining a P- and S-wave velocity profile.

With a measurement and knowledge of the normal pressure gradient dP/dz as per equation 1B various methods known to remove so-called ghost data in marine data can be applied to separate up- and downgoing wavefield in borehole seismic data. Such methods are for example described, in the published International patent application WO 02/01254, and the United Kingdom patent GB 2363459.

It is for example known to use the vertical pressure gradient given by:

$$P^u(z) = 0.5\left[P(z) + \frac{1}{ik_z} * dP(z)/dz\right] \qquad [3]$$

where $p^u(z)$ is the upgoing wavefield at position z along the borehole seismic cable, p(z) is the raw pressure recording and $k_z$ the vertical wavenumber. This equation can be solved in the frequency-wavenumber or FK-domain using borehole seismic cable data and the relation between the horizontal transverse and the vertical wavenumber and the known water velocity c:

$$k^2 = \omega^2/c^2 = k_x^2 + k_z^2 \qquad [4]$$

Further data relating to the P- and S-wavefield can be gained from the conversion of shear-waves into compressional wave at the wall of the borehole. A theory describing this conversion can be found for example in M. Schoenberg, "Fluid and solid motion in the neighborhood of a fluid-filled borehole due to the passage of a low-frequency elastic plane wave", Geophysics, 51 (1986), 1191-1205, incorporated herein for further reference.

Velocity measurements similar to the measurements using geophones can be made by exploiting the relationships such as $$dP/dx = \rho dv_x/dz \qquad [1C]$$

which converts measurements of any of the pressure gradient of equations 1A and 1B into velocity measurements in the respective velocity. Using this relationships to measure the velocities v(x), v(y) and v(z) renders the measurements of the borehole seismic cable equivalent to the signals or data as measured by a conventional geophone-based VSP survey. Hence, the established processing methods of VSP operations can in principle be used to separate P- and S-waves.

For a known orientation of the hydrophone group with respect to coordinate system of the acquisition, the velocity measurement in x, y and z direction or any other three independent direction can be readily converted into the cylindrical coordinate system v(r), v(φ) and v(z) used by Schoenberg to characterize the different particle velocities of P- and S-wave events in the borehole. Hence the results from Schoenberg can then be used to further characterize and identify in the measured pressure data events or waves as being P- or S-wave related (after conversion at the borehole wall.

In a non-vertical well it is important to establish the orientation of the hydrophones. The orientation of the hydrophones may also be affected by twisting or rotation movement of the cable within the wellbore.

These movements introduce an error in the pressure gradient measurements as the separation of the hydrophones changes in any fixed direction changes.

Figure 6:
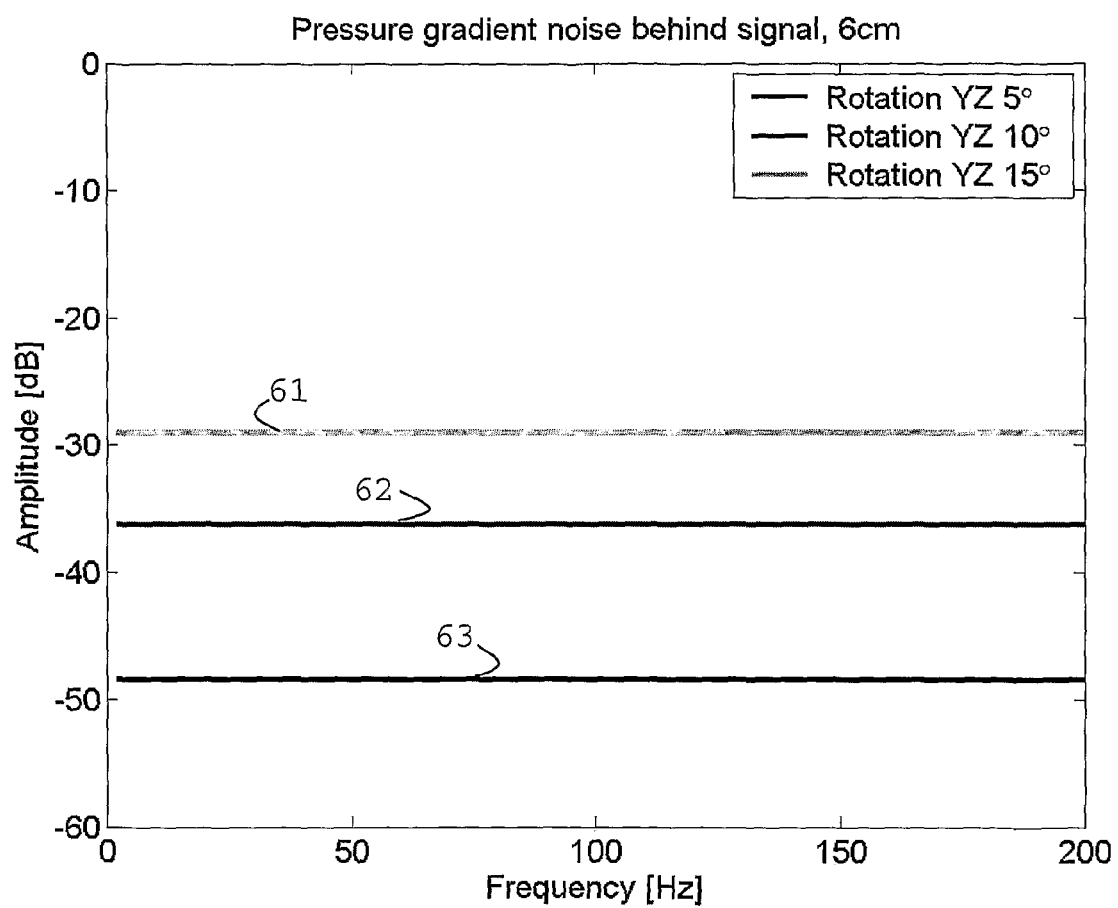
FIG. 6 illustrates the relative amplitude of a pressure gradient measurement as function of the signal frequency for the different rotation angles of a borehole seismic cable.

The error due to small rotation angles is shown in FIG. 6 with plots that illustrate the attenuation of the gradient signal at 6 cm separation for a rotation angle of 5° (61), 10° (62) and 15° (63). At 10° rotation angle for example, the curve 62 gives a −36.2 dB error that is almost constant with frequency.

In order to reduce the error generated by the borehole seismic cable rotation the present invention includes means to determine the angle of rotation of one or more groups of hydrophones inside the deployed borehole seismic cable.

In a first embodiment, the rotation angle of the cable can be measured using one or more inclinometers (or gyroscopes)

that measure the crossline angle with the horizontal. Such inclinometric devices have been used in recent Ocean Bottom cables (OBCs).

Alternatively, differences in the normal hydrostatic pressure can be exploited to determine the relative depths of the hydrophones. As the hydrophones rotate, the height of the water column above them changes and with it the static pressure. In U.S. Pat. No. 4,547,869, such a method is used for fiber pressure sensors, which are commonly more sensitive to slow or quasi-static pressure changes than ceramic-based hydrophones.

Once the rotation angle, $\alpha$, with respect to the given direction is known, its effect on the pressure gradient measurement can be corrected using (for the example of the transversal X direction:

$$dP/dx=(P(x1,z)-P(x2,z))/(\Delta x \cos \alpha) \quad [5]$$

This method is best applied to rotation angles close to the direction of the gradient, while for angles close to an orthogonal axis, the gradient is not measured as the difference $P_1-P_2$ becomes zero. This has been recognized as a weakness of the above embodiments and the following embodiments and examples of the invention demonstrate variants that avoid this weakness.

Figure 7A:
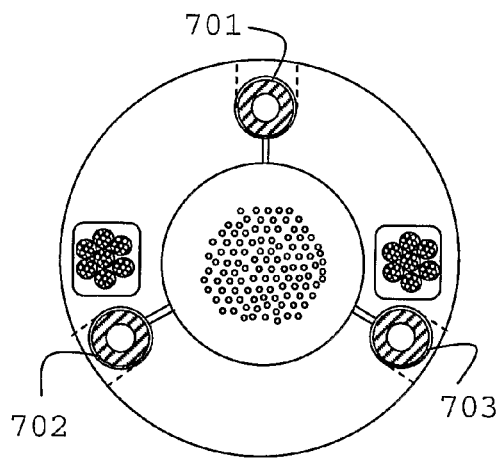
FIG. 7 shows another vertical cross-section of a borehole seismic cable with three hydrophones without and with inclinometer.
Figure 7B:
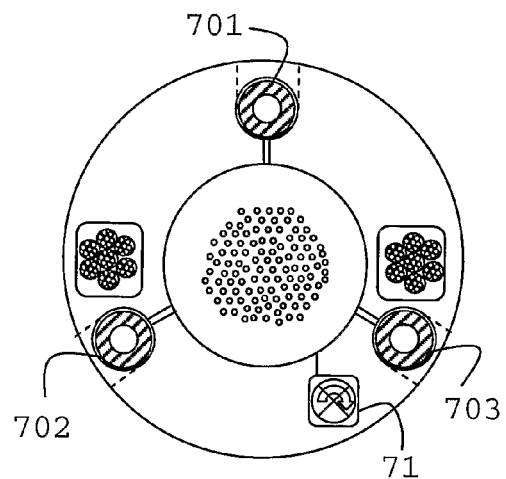

In a first of these preferred embodiments of the present invention, as illustrated in FIG. 7A, three hydrophones 701, 702, 703 are included in a group with each hydrophone being located at a corner of a triangle that in turn is oriented in the transversal plane, i.e. perpendicular to the longitudinal axis of the cable. The same group of hydrophones 701, 702, 703 is shown in FIG. 7B with a solid state MEMS type inclinometer 71. The inclinometer determines the rotation of the surrounding section of the borehole seismic cable and, hence, the orientation of the three hydrophones 701, 702, 703. Inclinometers 71 can be placed at the location of each hydrophone or more sparsely distributed along the borehole seismic cable. In the latter case mechanical models of the borehole seismic cable are used to interpolate the rotation of borehole seismic cable sections between two inclinometers.

Figure 7C:
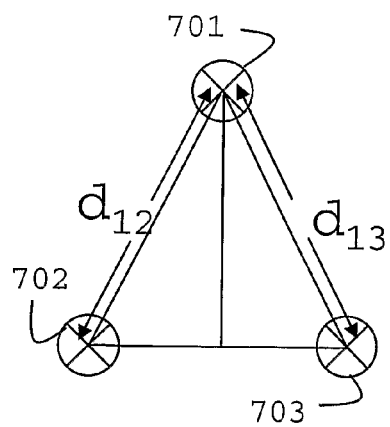

An equidistant triangle with d12=d13 is shown in FIG. 7C to illustrated the geometrical relationship and distances between the hydrophones. The embodiment of this FIG. 7 has the advantage that vertical pressure gradient can be obtained for any angle of borehole seismic cable rotation including 90 degrees. An additional benefit is that seismic interference noise from other acoustic sources can be reduced, as is explained in greater details below.

Once the orientation is known, a transverse gradient can be calculated. For an equilateral triangular configuration as shown in FIG. 7 the transverse pressure gradient in x-direction can be calculated as function of the borehole seismic cable rotation angle $\alpha$ by:

$$dP/dx=(P_1-P_2)/(2d_{12}\cos(30+\alpha))+(P_1-P_3)/(2d_{13}\cos(30-\alpha)) \quad [6]$$

Where $d_{12}$ and $d_{13}$ are the distances between hydrophones 701 and 702, and between 701 and 703, respectively, as indicated in FIG. 7B. The total pressure measurement can be gained as an average over all three pressure measurements Instead of recording the hydrophone signals directly the arrangement of FIG. 7 can be augmented by using an electric circuit as shown in FIG. 4. Outputs representing various linear combinations (additions/subtractions) of the hydrophone measurements can than be generated. For instance it is thus possible to output the average pressure $P_1+P_2+P_2$, and the differences $P_1-P_2$ and $P_1-P_3$. For a known borehole seismic cable rotation angle the transverse pressure gradient can then be calculated using equation 6.

Figure 8:
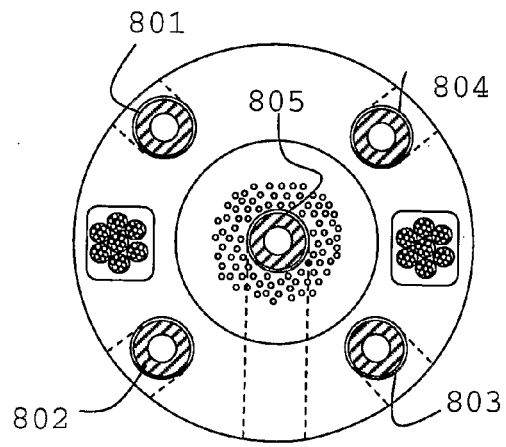
FIG. 8 shows a vertical cross-section of borehole seismic cable with a five hydrophones arranged in plane.

Another alternative configuration is shown in FIG. 8 with two orthogonal pressure gradient sensors, each consisting of two hardwired hydrophones 801-804, in combination with a fifth single hydrophone 805. This configuration is an extension of the hydrophone group shown in FIG. 3. And similar to the example of FIG. 4, the central hydrophone 805 of the group of FIG. 8 can be omitted when the two pairs of hydrophones are both summed and subtracted using an electrical circuit before digitizing.

The seismic interference in the data can be removed with single sensor adaptive filtering as described for example in the international patent application WO-97/25632.

In the above-described example the hydrophones forming a group are arranged in a plane essentially perpendicular to the main axis of the borehole seismic cable. Longitudinal or axial pressure gradient can be derived using pressure data obtained from neighboring groups. However, for many seismic applications it is advantageous to record as many components of the pressure wavefield as possible within the constraints posed by the equipment. Such a complete or near-complete acquisition of the wavefield can be accomplished using at least on additional hydrophone that is located outside the plane defined by the other hydrophones. The additional hydrophone can either be part of the same group, i.e. located close to the other hydrophones of the group, or be member of a distant, preferably neighboring group of hydrophones.

Figure 9:
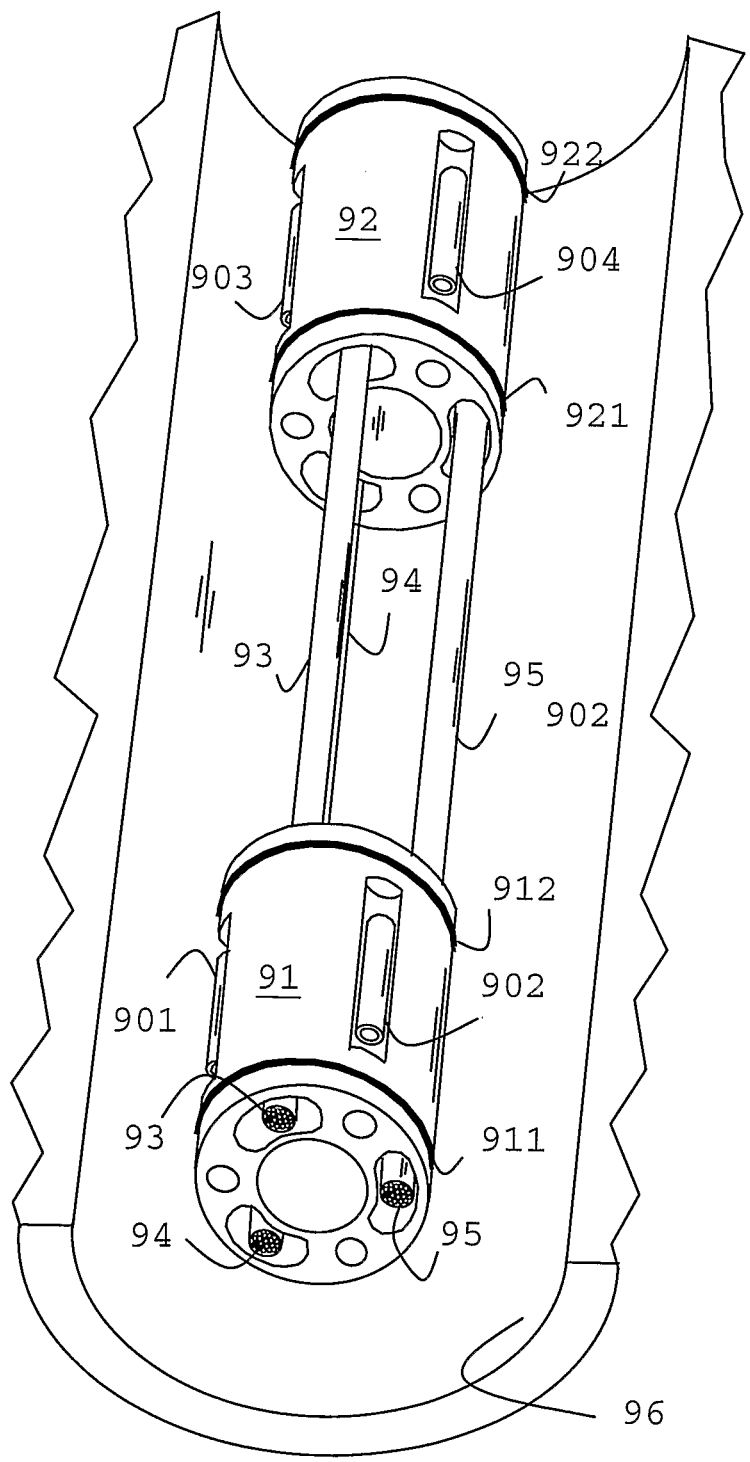
FIG. 9 shows a perspective view of a section of borehole seismic cable with two neighboring groups of three hydrophones.

In the example of FIG. 9, there is shown a perspective view on a section of a borehole seismic cable with two neighboring hydrophone holders 91, 92. The holders are made of a structural plastic material with holes to let wire cables 93, 94, 95 pass through the length of the borehole seismic cable section. The two holders have bays to mount six hydrophones 901-904, only four of which are visible in the view. The holders further carry sealing rings 911, 912 and 921, 922 to slip a resilient outer skin or sheath (not shown) over the borehole seismic cable to protect the sensors from the harsh environment of the borehole 96. The typical spacing between the two groups of hydrophones is 3.125 m.

The longitudinal pressure gradient dP/dz can be calculated combining the output of one group of hydrophones, such as the three hydrophones in the holder 91, with the output of a hydrophone of the neighboring group in the holder 92.

Figure 10:
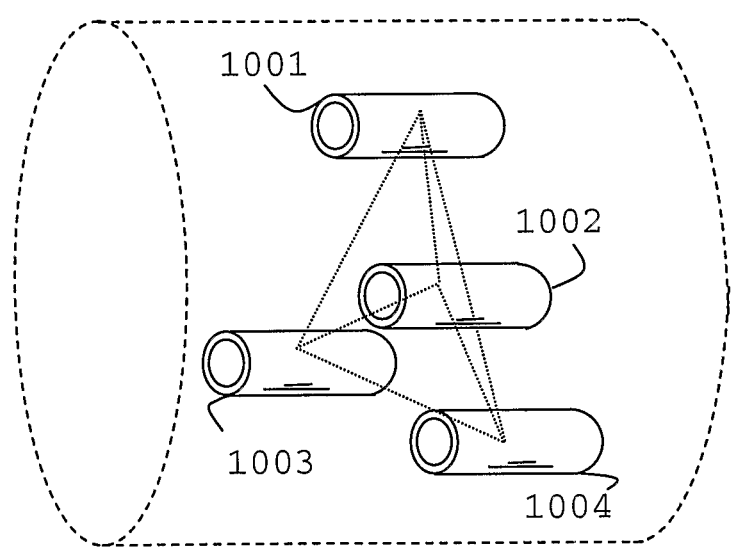
FIG. 10 shows a schematic perspective view of a section of borehole seismic cable with a tetrahedrally arranged group of four hydrophones.

In FIG. 10, an alternative embodiment is shown wherein a group of three hydrophones 1001-1003 in a plane perpendicular to the borehole seismic cable axis is combined with an additional out-of-plane hydrophone 1004. The four hydrophones 1001-1004 define a tetrahedral group of hydrophones which can be used to measure the complete acoustic wavefield, i.e. the pressure gradient in the longitudinal and transverse directions or any other three independent or orthogonal directions.

The invention claimed is:

1. A method of acquiring seismic data in a borehole seismic survey comprising
    lowering into the borehole a cable comprising an outer sheath enclosing a plurality of pressure sensors arranged in a succession of groups spaced along the cable with each group comprising at least three pressure sensors spaced from each other in directions transverse to the cable;
    transmitting seismic signals from a seismic source outside the borehole and spaced from it so that seismic signals travel through subterranean formation between the source and the borehole before reaching the borehole;
    using said plurality of pressure sensors of each group to measure pressures and also measure pressure gradients in two directions transverse to the longitudinal direction of the cable, the pressures and pressure gradients being of seismic signals from the seismic source converted at the boundary of the borehole into pressure waves.

2. The method of claim 1 wherein three pressure sensors of a group are located within a section of the cable of less than 10 cm length as measured in the longitudinal direction of said cable.

3. The method of claim 1 wherein three pressure sensors of a group are located in a plane perpendicular to the main or longitudinal axis of the cable.

4. The method of claim 3 wherein each group comprises a further pressure sensor located outside said plane and the pressure sensors of each group measure pressure gradients longitudinally of the cable.

5. The method of claim 4 wherein each group comprises four pressure sensors in a tetrahedral configuration.

6. The method of claim 1 comprising using pressure sensors in neighbouring groups to measure pressure gradients longitudinally of the cable.

7. The method of claim 1 wherein each group comprises three pressure sensors spaced from each other in directions transverse to the cable and a further pressure sensor spaced from said three pressure sensors in the longitudinal direction of the cable and the pressure sensors of each group measure pressure gradients longitudinally of the cable.

8. The method of claim 1 wherein each group comprises three pressure sensors spaced from each other in directions transverse to the cable and each of said three pressure sensors of a group is arranged at essentially equal distance from the other two sensors.

9. The method of claim 1 wherein the pressure sensors of a group are connected to provide an output representative of a linear combination of individual sensor signals prior to digitization.

10. The method of claim 1 wherein the borehole cable further includes a plurality of metering devices to determine the orientation of the groups when deployed in the borehole.

11. The method of claim 10 wherein the plurality of metering devices to determine the orientation of the groups when deployed in the borehole are a plurality of inclinometers distributed along the length of the cable.

12. The method of claim 1 wherein the pressure sensors are hydrophones.

13. The method of claim 1 wherein the pressure sensors are piezo-electric devices.

14. The method of claim 1 wherein a substantial number of the pressure sensors are separated from the wall of the borehole by a macroscopic layer of a fluid filling the borehole.

15. The method of claim 1 further comprising identifying, within the data measured by the pressure sensors, P- and S-wave related signals converted at the boundary of the borehole into pressure waves.

16. The method of claim 1 wherein the borehole cable further includes a plurality of inclinometers distributed along the length of the cable to determine the orientation of the groups when deployed in the borehole.

17. A method of acquiring P- and S-wave related seismic signals in a borehole seismic survey comprising
lowering into the borehole a cable comprising an outer sheath enclosing a plurality of pressure sensors arranged in a succession of groups spaced along the cable with each group comprising at least three pressure sensors in a plane perpendicular to the longitudinal axis of the cable and spaced from each other in directions transverse to the cable;
transmitting seismic signals from a seismic source outside the borehole and spaced from it so that seismic signals travel through subterranean formation between the source and the borehole before reaching the borehole;
using the at least three pressure sensors of each group to measure pressures and also measure pressure gradients in two directions transverse to the longitudinal direction of the cable,
using the plurality of pressure sensors to measure pressure gradients longitudinally of the cable;
the pressures and the pressure gradients both transversely and longitudinally of the cable being of P- and S-wave seismic signals from the seismic source converted at the boundary of the borehole into pressure waves.

18. The method of claim 17 wherein using the plurality of pressure sensors to measure pressure gradients longitudinally of the cable comprises using pressure sensors in neighbouring groups to measure pressure gradients longitudinally of the cable.

19. The method of claim 17 wherein each group comprises a further pressure sensor located outside said plane and using the plurality of pressure sensors to measure pressure gradients longitudinally of the cable comprises using the pressure sensors of each group measure pressure gradients longitudinally of the cable.

* * * * *